(12) United States Patent
Yao et al.

(10) Patent No.: US 12,089,102 B2
(45) Date of Patent: *Sep. 10, 2024

(54) DATA TRANSMISSION METHOD AND RELATED DEVICE

(71) Applicant: HUAWEI TECHNOLOGIES CO., LTD., Shenzhen (CN)

(72) Inventors: Chuting Yao, Beijing (CN); Haibo Xu, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 440 days.

This patent is subject to a terminal disclaimer.

(21) Appl. No.: 17/471,566

(22) Filed: Sep. 10, 2021

(65) Prior Publication Data

US 2022/0070748 A1    Mar. 3, 2022

Related U.S. Application Data

(63) Continuation of application No. 16/634,930, filed as application No. PCT/CN2017/097240 on Aug. 11, 2017, now Pat. No. 11,147,002.

(51) Int. Cl.
*H04W 76/00*    (2018.01)
*H04L 49/552*    (2022.01)
(Continued)

(52) U.S. Cl.
CPC .......... *H04W 36/03* (2018.08); *H04L 49/552* (2013.01); *H04W 36/0033* (2013.01); *H04W 88/04* (2013.01)

(58) Field of Classification Search
CPC . H04W 36/03; H04W 36/0033; H04W 88/04; H04W 28/0205; H04W 36/0055;
(Continued)

(56) References Cited

U.S. PATENT DOCUMENTS

2010/0322193 A1    12/2010   Hu et al.
2016/0029280 A1    1/2016    Qiu et al.
(Continued)

FOREIGN PATENT DOCUMENTS

CN    101997660 A    3/2011
CN    103037450 A    4/2013
(Continued)

OTHER PUBLICATIONS

NSN et al., "PDCP reordering after SeNB release", 3GPP TSG-RAN WG2 Meeting #85bis, R2-141177, Mar. 31-Apr. 4, 2014, total 3 pages, Valencia, Spain.

*Primary Examiner* — Brandon M Renner
(74) *Attorney, Agent, or Firm* — Maier & Maier, PLLC

(57) ABSTRACT

The method includes: handing over a first terminal device from a second terminal device to a network device; receiving, by the first terminal device, a first packet data convergence protocol PDCP data packet sent by the network device; and if the first PDCP data packet is a target PDCP data packet, submitting, by the first terminal device, a second PDCP data packet, where the target PDCP data packet is a PDCP data packet sent by the network device based on a transmission status report, and the transmission status report is a status report sent by the first terminal device or the second terminal device to the network device.

17 Claims, 7 Drawing Sheets

(51) Int. Cl.
*H04W 36/00* (2009.01)
*H04W 88/04* (2009.01)

(58) Field of Classification Search
CPC .... H04W 76/23; H04W 80/02; H04L 49/552; H04L 1/1841; H04L 2001/0097; H04L 47/34
See application file for complete search history.

(56) References Cited

U.S. PATENT DOCUMENTS

| | | |
|---|---|---|
| 2016/0044737 A1 | 2/2016 | Kwon |
| 2016/0295621 A1 | 10/2016 | Han et al. |
| 2017/0012997 A1 | 1/2017 | Wu et al. |
| 2017/0181185 A1 | 6/2017 | Lee et al. |
| 2018/0098376 A1* | 4/2018 | Jang .................. H04W 28/082 |
| 2018/0124865 A1 | 5/2018 | Lee et al. |
| 2018/0302834 A1 | 10/2018 | Zhang et al. |
| 2019/0116536 A1 | 4/2019 | Xu et al. |
| 2020/0383019 A1 | 12/2020 | Yao et al. |
| 2021/0099930 A1* | 4/2021 | Yao ...................... H04L 1/1841 |
| 2021/0297915 A1* | 9/2021 | Decarreau ............... H04L 47/34 |

FOREIGN PATENT DOCUMENTS

| | | |
|---|---|---|
| CN | 103249095 A | 8/2013 |
| CN | 103813454 A | 5/2014 |
| EP | 1871137 A2 | 12/2007 |
| EP | 2763495 A1 | 8/2014 |

* cited by examiner

DATA TRANSMISSION METHOD AND RELATED DEVICE

CROSS-REFERENCE TO RELATED APPLICATIONS

This application is a continuation of U.S. application Ser. No. 16/634,930, filed on Jan. 29, 2020, which is a national stage of International Application No. PCT/CN2017/097240, filed on Aug. 11, 2017. Both of the aforementioned applications are hereby incorporated by reference in their entireties.

TECHNICAL FIELD

Embodiments relate to the field of data transmission, and in particular, to a data transmission method and a related device.

BACKGROUND

In a device-to-device (D2D) communication mode, a transmit end directly sends data to a receive end, with no need to transfer the data by using a base station or through a cellular network. There is a relatively special D2D communication mode: a terminal device is connected to a network device by using another terminal device that has a relay function. In this communication mode, the former is referred to as a remote device (remote UE), and the latter is referred to as a relay device (relay UE). When quality of a link between the remote UE and the relay UE becomes poor, for example, when the remote UE moves, to ensure that the remote UE continues to communicate with the network device, the remote UE may be handed over to the network device in a path switching (or path switch) manner to communicate with the network device.

In a process of downlink transmission between the network device and the remote UE, if the remote UE performs path switching, the following case may occur: some data packets are successfully sent to the relay UE but unsuccessfully forwarded to the remote UE. The network device can obtain only receiving information fed back by the relay UE, but cannot learn an actual receiving status of the remote UE. In this case, a packet loss may occur in downlink transmission.

SUMMARY

Embodiments provide a data transmission method and a related device, so as to resolve a packet loss problem caused by path transfer in a downlink transmission process.

According to a first aspect, an embodiment provides a data transmission method applied to a remote device. The method includes: handing over a first terminal device from a second terminal device to a network device; receiving, by the first terminal device, a first packet data convergence protocol (PDCP) data packet sent by the network device; and if the first PDCP data packet is a target PDCP data packet, submitting, by the first terminal device, a second PDCP data packet, where the target PDCP data packet is a PDCP data packet sent by the network device based on a transmission status report, and the transmission status report is a status report sent by the first terminal device or the second terminal device to the network device, and used to feed back a receiving status of data that is sent by the network device to the first terminal device by using the second terminal device before the first terminal device is handed over to the network device, and the second PDCP data packet is PDCP data packets that start with a count value of the first PDCP data packet and that are counted successive to the count value of the first PDCP data packet.

In this embodiment, after patch switching is performed on the first terminal device and the first terminal device is handed over to the network device, and when the first terminal device receives the PDCP data packet sent by the network device and determines the PDCP data packet is the target PDCP data packet, the PDCP data packets that start with the count value of the PDCP data packet and that are counted successive to the count value of the PDCP data packet are submitted. The target PDCP data packet is data sent by the network device based on the transmission status report; and the transmission status report is used to feed back a receiving status of data that is sent by the network device to the first terminal device by using the second terminal device before the first terminal device is handed over to the network device. In other words, the target PDCP data packet is the PDCP data packet that is sent by the network device after the network device determines an actual receiving status of the first terminal device, the first terminal device submits the PDCP data packet only after determining that the target PDCP data packet is received. This can avoid a problem of packet loss or packet disorder.

In a possible embodiment, after the handing over a first terminal device from a second terminal device to a network device, the method further includes: sending, by the first terminal device, the transmission status report to the network device.

In a possible embodiment, if the first PDCP data packet is a next PDCP data packet of a last submitted PDCP data packet, the first PDCP data packet is the target PDCP data packet; and the last submitted PDCP data packet is a PDCP data packet that is submitted latest among PDCP data packets submitted by the first terminal device.

In a possible embodiment, the method further includes: if the first PDCP data packet is the target PDCP data packet, setting, by the first terminal device, a PDCP reordering indication as a first indication.

In a possible embodiment, the method further includes: if the first PDCP data packet is the target PDCP data packet, and a sequence number of the first PDCP data packet is equal to a sequence number of the first missing PDCP data packet indicated in the transmission status report, setting, by the first terminal device, a PDCP reordering indication as a first indication.

In a possible embodiment, the method further includes: when a first sequence value indicated by a transmission mapping indication is greater than a sequence value of the first missing PDCP data packet indicated in the transmission status report, if the first PDCP data packet is the target PDCP data packet and a sequence value of the last submitted PDCP data packet is greater than or equal to the first sequence value, or if the first PDCP data packet is the target PDCP data packet and a sequence value of the last submitted PDCP data packet is less than a sequence value of the first missing PDCP data packet, setting, by the first terminal device, the PDCP reordering indication as a first indication; or when the first sequence value is less than a sequence value of the first missing PDCP data packet, if the first PDCP data packet is the target PDCP data packet, a sequence value of the last submitted PDCP data packet is greater than or equal to the first sequence value, and a sequence value of the last submitted PDCP data packet is less than the sequence value of the first missing PDCP data packet, setting, by the first terminal device, a PDCP reordering indication as a first indication; and the first sequence value is a sequence value corresponding to the PDCP data packet indicated in the transmission status report.

In a possible embodiment, the method further includes: if the PDCP reordering indication is the first indication, submitting, by the first terminal device, a PDCP data packet whose count value is less than the count value of the first PDCP data packet; and submitting, by the first terminal device, the second PDCP data packet.

In a possible embodiment, if the first PDCP data packet is the first missing PDCP data packet indicated in the transmission status report, the first PDCP data packet is the target PDCP data packet; and before the submitting, by the first terminal device, the second PDCP data packet, the method further includes: submitting, by the first terminal device, a PDCP data packet whose count value is less than the count value of the first PDCP data packet.

In a possible embodiment, after the submitting, by the first terminal device, the second PDCP data packet, the method further includes: releasing, by the first terminal device, the transmission status report.

According to a second aspect, an embodiment provides another data transmission method applied to a network device side. The method includes:

receiving, by a network device, a transmission status report sent by a first terminal device or a second terminal device, where the transmission status report is used to feed back a receiving status of data that is sent by the network device to the first terminal device by using the second terminal device before the first terminal device is handed over to the network device; and after the first terminal device is handed over from the second terminal device to the network device, sending, by the network device, a target PDCP data packet to the first terminal device based on the transmission status report.

In this embodiment, when the first terminal device is handed over to the network device, the network device sends the PDCP data packet to the first terminal device only after receiving the transmission status report sent by the first terminal device or the second terminal device, and the transmission status report is used to feed back a receiving status of data that is sent by the network device to the first terminal device by using the second terminal device before the first terminal device is handed over to the network device. In other words, the network device sends the PDCP data packet sent by the first terminal device only after learning an actual receiving status of the first terminal device. This can avoid a problem of packet loss after patch switching.

According to a third aspect, an embodiment provides still another data transmission method applied to a relay device. The method includes:

sending, by a second terminal device, a transmission status report to a network device, where the transmission status report is used to feed back a receiving status of data that is sent by the network device to the first terminal device by using the second terminal device before the first terminal device is handed over to the network device; and the transmission status report is used by the network device to send a target PDCP data packet to the first terminal device based on the transmission status report.

In this embodiment, the second terminal device sends the transmission status report to the network device, to notify the network device of the receiving status of data that is sent by the network device to the first terminal device by using the second terminal device before the first terminal device is handed over to the network device, so that the network device can learn an actual receiving status of the first terminal device based on the transmission status report, and send, to the first terminal device in time, data that is not determined to be received by the first terminal device. This can avoid a problem of packet loss.

According to a fourth aspect, an embodiment provides a terminal device. The terminal device has a function of implementing the action method of the first terminal device in the first aspect. The function may be implemented by hardware, or may be implemented by hardware executing corresponding software. The hardware or the software includes one or more units corresponding to the functions.

In a possible embodiment, the terminal device includes a receiving unit and a processing unit. The processing unit is configured to perform a process of handover from a second terminal device to a network device; the receiving unit is further configured to receive a first packet data convergence protocol PDCP data packet sent by the network device; and if the first PDCP data packet is a target PDCP data packet, the processing unit is further configured to submit a second PDCP data packet, where the target PDCP data packet is a PDCP data packet sent by the network device based on a transmission status report, and the transmission status report is a status report sent by the first terminal device or the second terminal device to the network device, and used to feed back a receiving status of data that is sent by the network device to the first terminal device by using the second terminal device before the first terminal device is handed over to the network device, and the second PDCP data packet is PDCP data packets that start with a count value of the first PDCP data packet and that are counted successive to the count value of the first PDCP data packet.

In a possible embodiment, the terminal device includes a processor, a memory, and a transceiver. The processor, the memory, and the transceiver are connected to each other. The memory is configured to store program code, and the processor is configured to invoke the program code to perform the following operations: performing a process of handover from a second terminal device to a network device; receiving, by using the transceiver, a first packet data convergence protocol PDCP data packet sent by the network device; and if the first PDCP data packet is a target PDCP data packet, submitting a second PDCP data packet, where the target PDCP data packet is a PDCP data packet sent by the network device based on a transmission status report, and the transmission status report is a status report sent by the terminal device or the second terminal device to the network device, and used to feed back a receiving status of data that is sent by the network device to the terminal device by using the second terminal device before the terminal device is handed over to the network device, and the second PDCP data packet is PDCP data packets that start with a count value of the first PDCP data packet and that are counted successive to the count value of the first PDCP data packet.

Based on a same concept, for a problem-resolving principle and beneficial effects of the terminal device, refer to the method in the first aspect and beneficial effects brought by the method. For implementation of the terminal device, refer to implementation of the method on the first terminal device side in the first aspect. No repeated description is provided for the sake of brevity.

According to a fifth aspect, an embodiment provides a network device. The network device has a function of implementing the action method of the network device in the second aspect. The function may be implemented by hardware, or may be implemented by hardware executing corresponding software. The hardware or the software includes one or more units corresponding to the functions.

In a possible embodiment, the network device includes a sending unit and a receiving unit. The receiving unit is configured to receive a transmission status report sent by a first terminal device or a second terminal device, where the transmission status report is used to feed back a receiving status of data that is sent by the network device to the first terminal device by using the second terminal device before the first terminal device is handed over to the network device; and after the first terminal device is handed over from the second terminal device to the network device, the sending unit is configured to send a target PDCP data packet to the first terminal device based on the transmission status report.

In a possible embodiment, the network device includes a processor, a memory, and a transceiver. The processor, the memory, and the transceiver are connected to each other. The memory is configured to store program code, and the processor is configured to invoke the program code to perform the following operations: receiving, by using the transceiver, a transmission status report sent by a first terminal device or a second terminal device, where the transmission status report is used to feed back a receiving status of data that is sent by the network device to the first terminal device by using the second terminal device before the first terminal device is handed over to the network device; and after the first terminal device is handed over from the second terminal device to the network device, sending, by using the transceiver, a target PDCP data packet to the first terminal device based on the transmission status report.

Based on a same concept, for a problem-resolving principle and beneficial effects of the network device, refer to the method in the second aspect and beneficial effects brought by the method. For implementation of the network device, refer to implementation of the method on the network device side in the second aspect. No repeated description is provided for the sake of brevity.

According to a sixth aspect, an embodiment provides a terminal device. The terminal device has a function of implementing the action of the second terminal device in the method according to the third aspect. The function may be implemented by hardware, or may be implemented by hardware executing corresponding software. The hardware or the software includes one or more units corresponding to the functions.

In a possible embodiment, the terminal device includes a sending unit, where the sending unit is configured to send a transmission status report to a network device, where the transmission status report is used to feed back a receiving status of data that is sent by the network device to the first terminal device by using the terminal device before the first terminal device is handed over to the network device, and the transmission status report is used by the network device to send a target PDCP data packet to the first terminal device based on the transmission status report.

In a possible embodiment, the terminal device includes a processor, a memory, and a transceiver. The processor, the memory, and the transceiver are connected to each other. The memory is configured to store program code, and the processor is configured to invoke the program code to perform the following operations: sending, by using the transceiver, a transmission status report to a network device, where the transmission status report is used to feed back a receiving status of data that is sent by the network device to the first terminal device by using the terminal device before the first terminal device is handed over to the network device; and the transmission status report is used by the network device to send a target PDCP data packet to the first terminal device based on the transmission status report.

Based on a same concept, for a problem-resolving principle and beneficial effects of the terminal device, refer to the method in the third aspect and beneficial effects brought by the method. For implementation of the terminal device, refer to implementation of the method on the second terminal device side in the third aspect. No repeated description is provided for the sake of brevity.

According to a seventh aspect, an embodiment provides a computer storage medium, configured to store a computer program instruction used by a first terminal device, where the computer program instruction includes a program used to execute the foregoing first aspect.

According to an eighth aspect, an embodiment provides a computer storage medium, configured to store a computer program instruction used by a network device, where the computer program instruction includes a program used to execute the foregoing second aspect.

According to a ninth aspect, an embodiment provides a computer storage medium, configured to store a computer program instruction used by a second terminal device, where the computer program instruction includes a program used to execute the foregoing third aspect.

In this embodiment, if the path switching is performed on the first terminal device and the first terminal device is handed over to the network device, the first terminal device or the second terminal device sends the transmission status report to the network device, to notify the network device of an actual receiving status of the first terminal device that is before the first terminal device is handed over to the network device, so that the network device sends the target PDCP data packet to the first terminal device based on the transmission status report. After receiving the transmission status report, the network device sends the PDCP data packet to the first terminal device, to avoid a packet loss. In addition, the first terminal device submits the PDCP data packet after receiving the target PDCP data packet sent by the network device based on the transmission status report, which further having a function of avoiding a packet loss.

DESCRIPTION OF EMBODIMENTS

The following describes technical solutions in embodiments with reference to the accompanying drawings in the embodiments.

Figure 1:
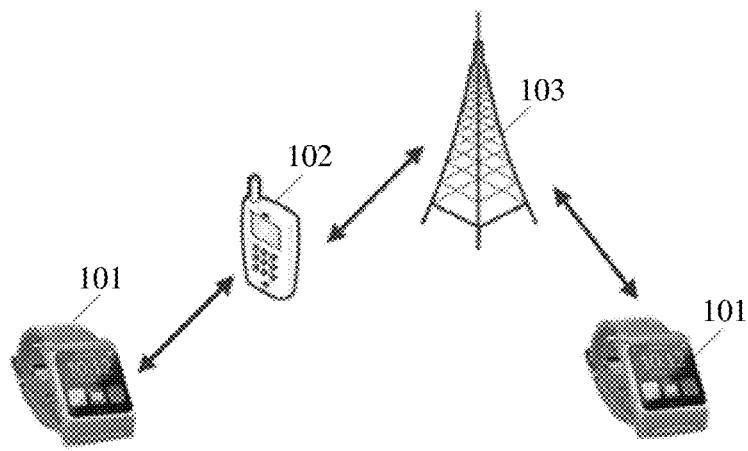
FIG. 1 is a schematic diagram of a system architecture according to an embodiment.

This embodiment may be applied to a wireless communications system in which a terminal device communicates with a network device by using a terminal device that has a relay function. A system architecture of the wireless communications system may be shown in FIG. 1. FIG. 1 is a schematic diagram of a system architecture according to an embodiment. The terminal device 101 is connected to the network device 103 by using the terminal device 102 that has the relay function, and the terminal device 101 sends uplink data to the network device 103 or receives downlink data sent by the network device 103 by using the terminal device 102 that has the relay function. The terminal device 101 may alternatively be directly connected to the network device 103 to communicate with the network device 103. The terminal device 101 may also be referred to as a remote device, and the terminal device 102 may also be referred to as a relay device. In some exemplary implementations, the network device may be a base station.

It can be noted that the wireless communications system in this embodiment includes but is not limited to: a narrowband internet of things system (NB-IoT), a global system for mobile communications system (GSM), an enhanced data rate for GSM evolution system (EDGE), a wideband code division multiple access system (WCDMA), a code division multiple access 2000 system (CDMA2000), a time division synchronous code division multiple access system (TD-SCDMA), an LTE system, a 5G system, and a future mobile communications system.

The base station in the embodiments is an apparatus that is deployed in a radio access network and that is configured to provide a wireless communication function for the terminal device. The base station may include a macro base station, a micro base station (also referred to as a small cell), a relay station, an access point, a transmission access point (TRP), and the like in various forms. In systems using different radio access technologies, names of devices that have a function of a base station may be different. For example, in a 5G system, the device is referred to as a new-generation node B (gNB), in an optional solution, the device is referred to as an evolved node B (ENB, or eNodeB), and in a 3rd generation, 3G system, the device is referred to as a node B (NB). For ease of description, in all the embodiments, the foregoing apparatuses that provide a wireless communication function for the terminal device are generally referred to as network devices.

A terminal device in the embodiments may be a device that provides a user with voice and/or data connectivity, a handheld device with a radio connection function, or another processing device connected to a wireless modem. The terminal device may communicate with one or more core networks through a radio access network (RAN). The terminal device may be a mobile terminal, such as a mobile phone (also referred to as a "cellular" phone) and a computer with a mobile terminal, for example, may be a portable, a pocket-sized, a handheld, a computer built-in, or an in-vehicle mobile apparatus, which exchanges voice and/or data with the radio access network. For example, the wireless terminal may be a device such as a personal communications service (PCS) phone, a cordless telephone set, a session initiation protocol (SIP) phone, a wireless local loop (WLL) station, or a personal digital assistant (PDA). The terminal device may also be referred to as a system, a subscriber unit, a subscriber station, a mobile station, a mobile console, a remote station, an access point, a remote terminal, an access terminal, a user terminal, a user agent, a user device, or user equipment (UE).

In some possible embodiment, the terminal device needs to be handed over from the terminal device that has the relay function to the network device to directly communicate with the network device. In an implementation, for a process in which the terminal device is handed over from the terminal device that has the relay function to the network device, refer to a handover process of the terminal device, in other words, a process in which the terminal device is handed over from a first network device to a second network device. The handover process of the terminal device includes the following stages.

(1) In a handover preparation phase, the first network device sends a handover request to the second network device, to notify the second network device that the terminal device needs to be handed over to the second network device. The second network device sends, to the first device based on a resource status of the second network device, an acknowledgment response that carries configuration information. The first network device sends the received configuration information to the terminal device by using a radio resource control (RRC) connection reconfiguration message.

(2) In a handover phase, the terminal device disconnects from the first network device and accesses the second network device. At the same time, the first network device sends a sequence value (SN) of a transmitted packet data convergence protocol (PDCP) service data unit (SDU) to the second network device, so that the network device determines a receiving status of data sent by using the first network device to the terminal device.

Figure 2:
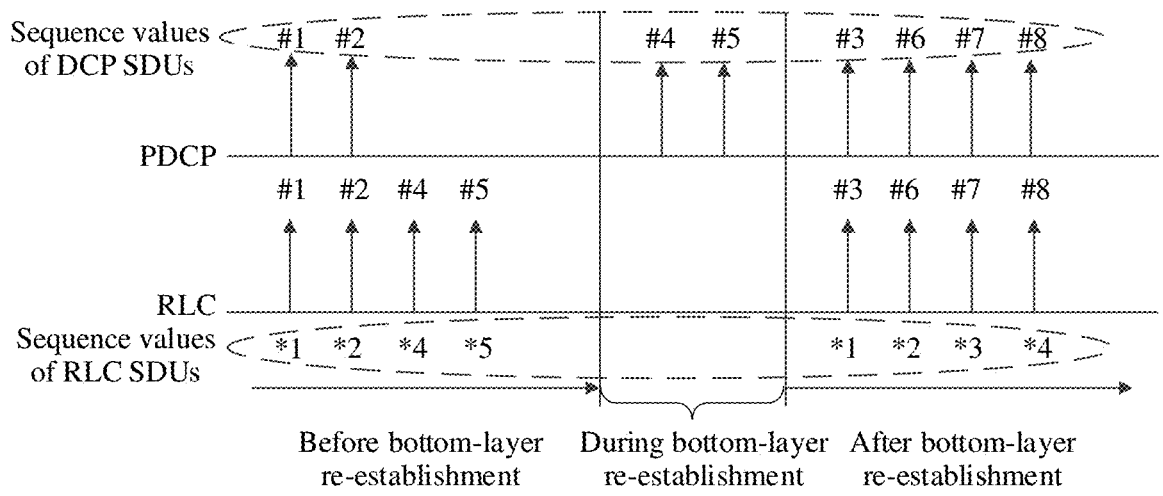
FIG. 2 is a schematic diagram of a change of sequence numbers of PDCP service data unit (SDU) and Radio Link Control (RLC) SDU.

In the handover phase, after receiving the RRC connection reconfiguration message, the terminal device starts re-establishment based on the configuration information, in other words, completes re-establishment of a PDCP layer, re-establishment of a radio link control (RLC) layer, and reconfiguration of a multimedia access control (MAC) layer based on the configuration information. Both before the bottom-layer re-establishment (referring to re-establishment of the RLC layer) and after the bottom-layer re-establishment, the terminal device performs an RLC reordering function. In a process of the bottom-layer re-establishment, the terminal device performs a PDCP reordering function, and after the bottom-layer re-establishment, the terminal device stops performing the PDCP reordering function. In addition, as shown in FIG. 2, after the bottom-layer re-establishment, sequence values of PDCP SDUs remain unchanged, a number sequence of the PDCP SDUs before the bottom-layer re-establishment is used, and RLC SDUs use new sequence values, in other words, the RLC SDUs are re-numbered from a minimum sequence value.

If the PDCP reordering function is not performed, the terminal device performs the following operations:

submitting, by the terminal device, a PDCP SDU whose count value (COUNT) is less than a count value of the currently received PDCP SDU;

submitting, by the terminal device, a PDCP SDU whose count value follows the count value of the currently received PDCP SDU and is continuous with the count value of the currently received PDCP SDU in currently stored PDCP SDUs; and setting, by the terminal device, a sequence value (Last_Submitted_PDCP_RX_SN) of the PDCP SDU last submitted by the PDCP as a sequence value of a last submitted PDCP SDU.

If the PDCP reordering function is performed, the terminal performs the following operations:

if the sequence value of the currently received PDCP SDU is equal to the sequence value of the PDCP SDU last submitted by the PDCP plus one, or the sequence value of the currently received PDCP SDU is equal to a difference between the sequence value of the PDCP SDU last submitted by the PDCP and a maximum sequence value (Maximum_PDCP_SN) of the PDCP, submitting, by the terminal device, a PDCP SDU, in currently stored PDCP SDUs, whose count value is successive to a count value of the currently received PDCP SDU; and setting, by the terminal device, a sequence value of the PDCP SDU last submitted by the PDCP as a sequence value of a last submitted PDCP SDU.

Figure 3:
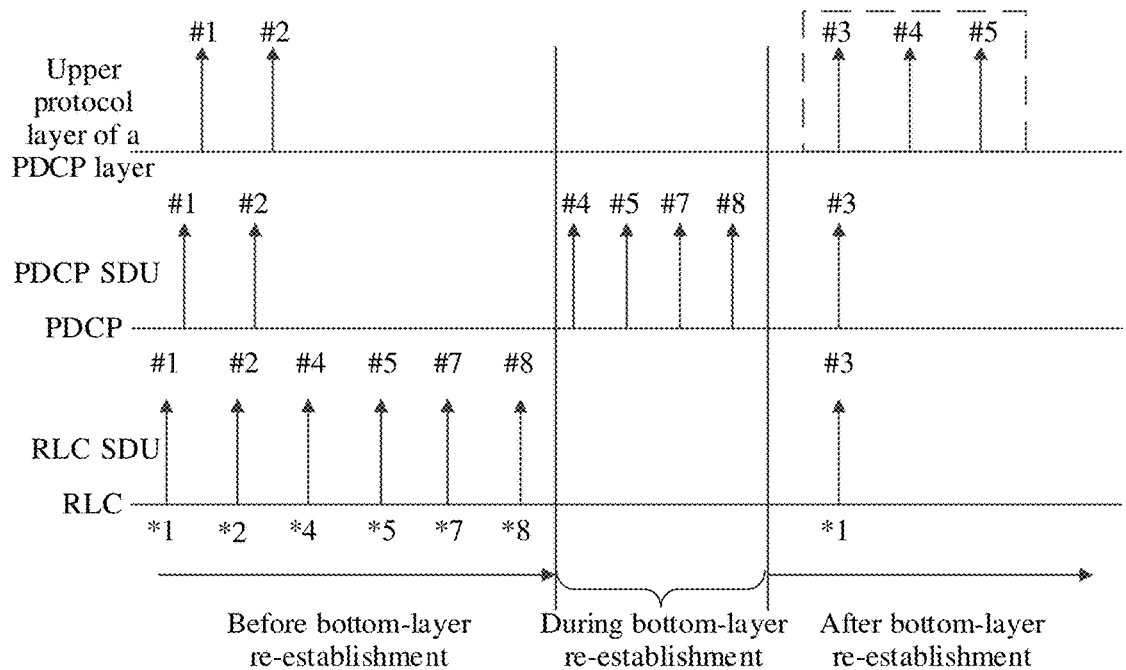
FIG. 3 is a schematic diagram of submitting data by a terminal device according to an embodiment.

In the handover process, a process in which the terminal device receives an RLC SDU and a PDCP SDU that is corresponding to the RLC SDU may be shown in FIG. 3. FIG. 3 is a schematic diagram of submitting data by a terminal device according to an embodiment. A process of receiving the data by the terminal device may include three stages: before the bottom-layer re-establishment, during the bottom-layer re-establishment, and after the bottom-layer re-establishment.

(1) Before the bottom-layer re-establishment: the terminal device performs an RLC reordering function, but does not perform a PDCP reordering function.

The RLC layer of the terminal device receives RLC SDUs whose sequence values are 1, 2, 4, 5, 7, and 8. The RLC layer of the terminal device submits the RLC SDUs whose sequence values are 1 and 2 to the PDCP layer. Because a sequence value 4 is not equal to 2+1, the RLC layer stops submitting an RLC SDU, saves the RLC SDUs whose sequence values are 4, 5, 7, and 8, and waits for an arrival of an RLC SDU whose sequence value is 3. Correspondingly, the PDCP layer submits PDCP SDUs whose sequence values are 1 and 2 to an upper protocol layer of the PDCP layer.

(2) During the bottom-layer re-establishment: the terminal device stops performing an RLC reordering function, but performs a PDCP reordering function.

When the bottom-layer re-establishment is performed, the RLC layer submits RLC SDUs whose sequence values are 4, 5, 7, and 8 to the PDCP layer. Correspondingly, the PDCP layer receives PDCP SDUs whose sequence values are 4, 5, 7, and 8. The PDCP SDUs whose sequence values 4, 5, 7, and 8 are received due to the bottom-layer re-establishment, but neither of the sequence values 4, 5, 7, and 8 is equal to 2+1. The PDCP layer saves the PDCP SDUs whose sequence values are 4, 5, 7, and 8, and waits for an arrival of a PDCP SDU whose sequence value is 3.

(3) After the bottom-layer re-establishment: the terminal device performs an RLC reordering function, but does not perform a PDCP reordering function.

The RLC layer of the terminal device receives an RLC SDU whose sequence value is 1, where the RLC SDU whose sequence value is 1 is corresponding to a PDCP SDU whose sequence value is 3. The RLC layer of the terminal device submits the RLC SDU whose sequence value is 1 to the PDCP layer. Correspondingly, the PDCP layer receives the PDCP SDU whose sequence value is 3, the sequence value 3 is equal to 2+1, and the PDCP layer submits PDCP SDUs whose sequence values are 3, 4, and 5.

In the foregoing manner, the terminal device may be handed over from the first network device to the second network device, and the terminal device sends, by using the first network device, a sequence value of a transmitted PDCP SDU to the second network device. The second network device may determine a data receiving status of the terminal device, and the PDCP layer of the terminal device performs the PDCP reordering function in the bottom-layer re-establishment process, to ensure that no packet is missing during the bottom-layer re-establishment.

Figure 4:
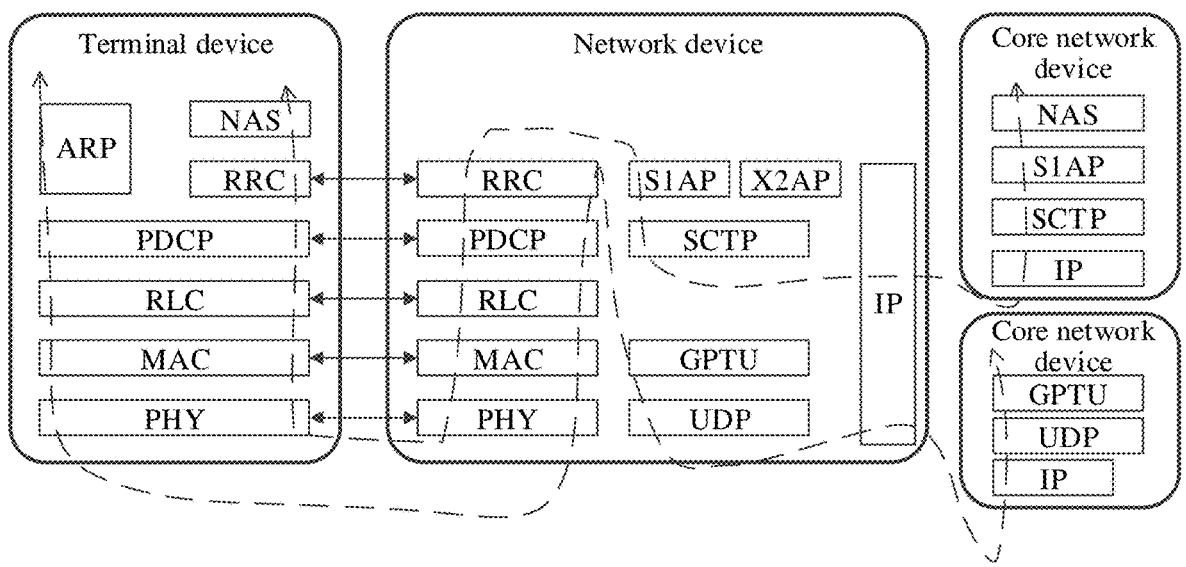
FIG. 4 is a diagram of a communications protocol architecture used by a terminal device and a core network device to perform data transmission and to perform handover.
Figure 5:
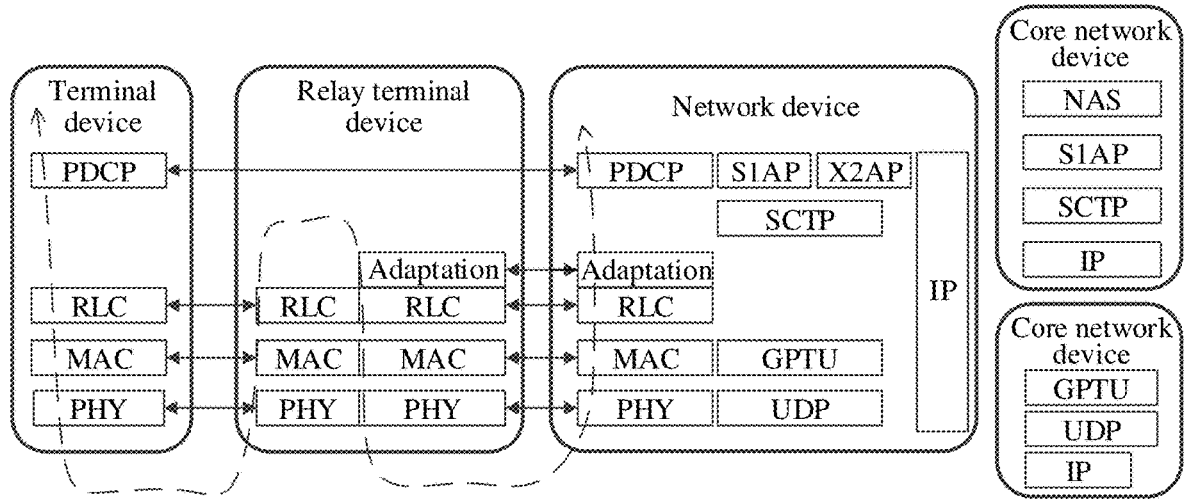
FIG. 5 is another communications protocol architecture used by a terminal device and a network device to perform data transmission and to perform handover.
Figure 6:
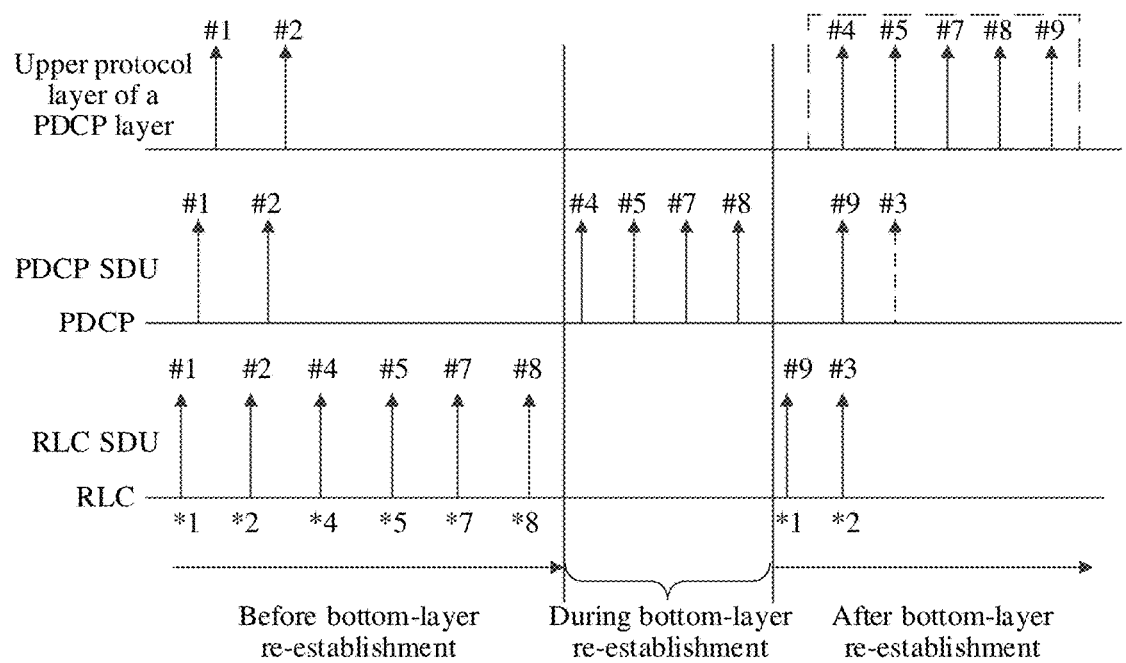
FIG. 6 is a schematic diagram of receiving data by a terminal device according to an embodiment.

However, the foregoing solution is only applicable to a wireless communications system that uses the communications protocol architecture shown in FIG. 4. In the wireless communications system, PDCP layer processing is performed at the first network device for data transmission between the terminal device and a core network device. When a handover occurs, that is, the terminal device is handed over from the first network device to the second network device to perform data transmission with the core network device, the first network device may learn a status of PDCP SDUs sent by the core network device to the terminal device, and then feed back sequence values of the transmitted PDCP SDUs to the second network device, to notify the second network device of a data receiving status of the terminal device. For a wireless communications system that uses the communications protocol architecture shown in FIG. 5, PDCP layer processing is not performed at a relay terminal device for data transmission between the terminal device and the network device, and the relay terminal device directly forwards an RLC SDU to the terminal device or the network device at an adaptation layer. When a handover occurs, that is the terminal device is handed over from the relay terminal device to the network device to perform data transmission with the network device, the relay terminal device cannot feed back a sequence value of a successfully transmitted PDCP SDU to the network device. In addition, in the foregoing solution, the PDCP layer of the terminal device performs the PDCP reordering function only in the bottom-layer re-establishment process. If the receiving status of the terminal device is shown in FIG. 6, that is, PDCP SDUs whose sequence values are 3 and 6 are missing before the bottom-layer re-establishment, and after the bottom-layer re-establishment, the terminal device receives the PDCP SDU whose sequence value is 3 only after receiving a PDCP SDU whose sequence value is 9, the PDCP layer of the terminal device first submits the PDCP SDUs whose sequence values are 4, 5, 7, 8, and 9. In this case, when the PDCP layer receives the PDCP SDU whose sequence value is 3, the PDCP SDU whose sequence value is 3 may be directly discarded by the PDCP layer because all the PDCP SDUs with sequence values less than or equal to 9 are submitted, thereby causing a packet loss. Even if the PDCP SDU whose sequence value is 3 is submitted to an upper layer, a problem of disorder may also occur.

However, by using the solution in the embodiments, the terminal device submits the PDCP data packet only after receiving the target PDCP data packet, so as to avoid a problem of packet loss and packet disorder when the path switching is performed.

The foregoing describes a possible embodiment of an operation and path switching of the terminal device when the terminal device performs the PDCP reordering function or does not perform the PDCP reordering function. The following describes a method and a related apparatus in embodiments.

In this embodiment, a data packet may refer to a protocol data unit (PDU), or may refer to a service data unit (SDU). It can be understood that, in different application scenarios, the data packet refers to different data units. For example, at a transmit end, the SDU refers to a data packet that is received by a target protocol layer from an upper layer protocol layer of the target protocol layer and that is not encapsulated by the target protocol layer, and the PDU refers to a data packet that is encapsulated by the target protocol layer and that is sent to a lower protocol layer of the target protocol layer. At a receive end, an SDU refers to a data packet that is decapsulated by the target protocol layer, and a PDU refers to a data packet that is received by the target protocol layer from a lower protocol layer of the target protocol layer and that has not been decapsulated by the target protocol layer. The SDU refers to a data packet transmitted between different protocol layers of a same device. The PDU refers to a data packet transmitted between counterpart protocol entities of different devices. In this embodiment, without further description, a sequence number may refer to a SN, or may refer to a COUNT. There is a correspondence between a count value and a sequence value of a same PDCP data packet.

Figure 7:
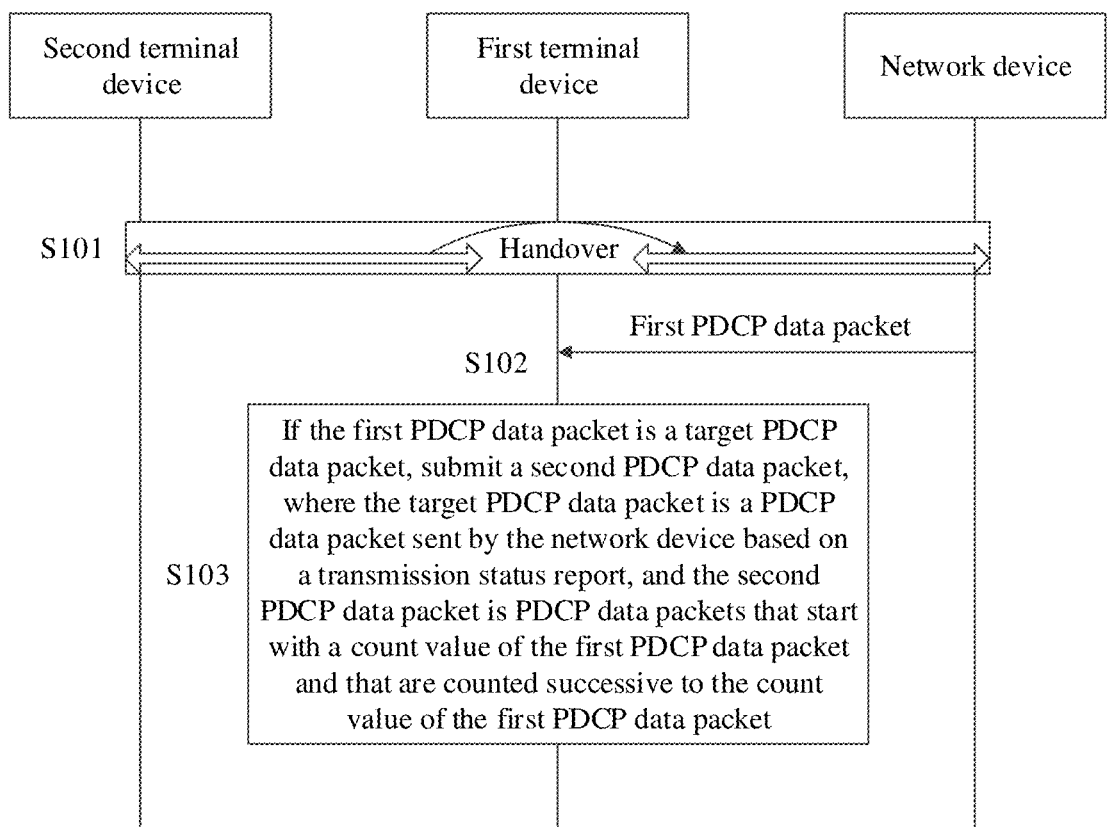
FIG. 7 is a schematic flowchart of a data transmission method according to an embodiment.

FIG. 7 is a schematic flowchart of a data transmission method according to an embodiment. As shown in the figure, the method includes at least the following steps.

S101. A first terminal device is handed over from a second terminal device to a network device.

In an exemplary implementation, the first terminal device obtains configuration information of the network device, completes PDCP recovery/re-establishment, RLC re-establishment, and MAC reconfiguration based on the configuration information, and accesses the network device. In addition, when the first terminal device starts the PDCP recovery/re-establishment or the RLC re-establishment, the first terminal device starts to perform a PDCP reordering function.

In an optional embodiment, before the first terminal device is handed over from the second terminal device to the network device, the first terminal device receives a path switching instruction sent by the second terminal device, and the first terminal device is handed over to the network device according to the path switching instruction.

The path switching instruction may carry configuration information allocated by the network device. In an optional implementation, the path switching instruction may be a path switching instruction proactively sent by the second terminal device to the first terminal device, or may be a path switching instruction sent by the network device to the first terminal device by using the second terminal device.

For example, reference may be made to the foregoing handover process. When the second terminal device detects that quality of a link between the second terminal device and the first terminal device becomes poor, the second terminal device sends a handover request to the network device, to notify the network device that the first terminal device needs to be handed over to the network device. The network device sends, to the second terminal device based on a resource status of the network device, an acknowledgment response that carries the configuration information, and the second terminal device adds the configuration information to the path switching instruction and sends the path switching instruction to the first terminal device.

For example, when the second terminal device detects that quality of the link between the second terminal device and the first terminal device becomes poor, the second terminal device reports a report of the link quality between the second terminal device and the first terminal device to the network device. After the network device receives the quality report, the network device sends, to the second terminal device based on a resource status of the second terminal device, a path switching instruction that carries the configuration information, and the second terminal device forwards the path switching instruction to the network device.

In a possible embodiment, if the path switching instruction carries the configuration information, the first terminal device obtains the configuration information of the network device from the path switching instruction. In another possible embodiment, the first terminal device may obtain the configuration information from the second terminal device after receiving the path switching instruction sent by the second terminal device.

In an optional embodiment, when the first terminal device is handed over from the second terminal device to the network device, the second terminal device may further send a transmission status report to the network device, where the transmission status report is used to feed back a receiving status of data that is sent by the network device to the first terminal device by using the second terminal device before the first terminal device is handed over to the network device. The transmission status report may be used to feed back a receiving status of an RLC data packet sent by the network device to the first terminal device before the first terminal device is handed over to the network device. For example, the transmission status report is a report of an adaptation layer, and in other words, after sending the path switching instruction to the first terminal device, the second terminal device sends the report of the adaptation layer to the network device, so as to feed back a receiving status of all RLC data packets sent by the network device to the first terminal device before the first terminal device is handed over to the network device. After receiving the transmission status report, the network device may determine, based on the transmission status report, which RLC data packets are determined by the first terminal device to have been received, and which RLC data packets are not determined by the first terminal device to have been received. The network device may determine, based on sequence numbers of RLC data packets, which PDCP data packets are determined by the first terminal device to have been received, and which PDCP data packets are not determined by the first terminal device to have been received. Further, the network device may send a target PDCP data packet to the first terminal device based on the transmission status report, where the target PDCP data packet is a data packet that has been sent by the network device to the first terminal device by using the second terminal device but is not determined to have been received by the first terminal device.

In an implementation, the second terminal device may send the transmission status report to the network device after receiving an acknowledgment message (ACK) that is for the RLC data packet sent by the network device to the first terminal device by using the second terminal device and that is fed back by the first terminal device. For example, before the first terminal device is handed over to the network device, the network device sends RLC data packets whose sequence numbers are 1 to 100 to the first terminal device, and the second terminal device separately receives acknowledgment messages of RLC data packets whose sequence numbers are 1 to 32, 35 to 70, and 73 to 100, the second terminal device determines that a receiving status of the RLC data packets sent by the network device to the first terminal device before the first terminal device is handed over to the network device is: RLC data packets whose sequence numbers are 1 to 32, 35 to 70, and 73 to 100 are successfully received, and RLC data packets whose sequence numbers are 33, 34, 71, and 72 are missing. Further, the second terminal device feeds back the receiving status of the RLC data packets to the network device by using a transmission status report, and the network device determines, based on the receiving status of the RLC data packets, the receiving status of the corresponding PDCP data packets.

In an implementation, the second terminal device may send the transmission status report to the network device after receiving a negative acknowledgment message (NACK) that is for the RLC data packet sent by the network device to the first terminal device by using the second terminal device and that is fed back by the second terminal device. For example, before the first terminal device is handed over to the network device, the network device sends RLC data packets whose sequence numbers are 1 to 100 to the first terminal device by using the second terminal device, and the second terminal device separately receives RLC data packets whose sequence numbers are 34 and 35, the second terminal device determines that a receiving status of the RLC data packets sent by the network device to the first terminal device before the first terminal device is handed over to the network device is: RLC data packets whose sequence numbers are 1 to 33 and 36 to 100 are successfully received, and RLC data packets whose sequence numbers are 34 and 35 are missing.

In still another implementation, if the second terminal device does not receive a feedback message sent by the first terminal device, the second terminal device determines that an RLC data packet corresponding to the feedback message is missing. For example, the second terminal device sends RLC data packets whose sequence numbers are 33 to 40 to the first terminal device. If no feedback message is received for any RLC data packet, it is determined that all the RLC data packets whose sequence numbers are 33 to 40 are missing.

In an optional embodiment, when the first terminal device is handed over from the second terminal device to the network device, the second terminal device may further send a transmission status report to the network device, where the transmission status report is used to feed back a receiving status of data that is sent by the network device to the first terminal device by using the second terminal device before the first terminal device is handed over to the network device.

In an implementation, after being handed over to the network device, the first terminal device may send the transmission status report to the network device by using an obtained first available uplink resource. The transmission status report may be used to feed back a receiving status of all PDCP data packets that are sent by the network device to the first terminal device before the first terminal device is handed over to the network device. For example, the transmission status report may be a PDCP status report.

S102. The network device sends a first PDCP data packet to the first terminal device, and the first terminal device receives the first PDCP data packet.

In an optional embodiment, after the first terminal device is handed over from the second terminal device to the network device, the network device may send the first PDCP data packet to the first terminal device based on the transmission status report after receiving the transmission status report sent by the first terminal device or the second terminal device, the first PDCP data packet is a target PDCP data packet.

In an optional embodiment, after the first terminal device is handed over to the network device, the network device may also send the first PDCP data packet to the first terminal device even if the transmission status report sent by the first terminal device or the second terminal device is not received.

S103. If the first PDCP data packet is a target PDCP data packet, the first terminal device submits a second PDCP data packet. The target PDCP data packet is a PDCP data packet sent by the network device based on the transmission status report, and the second PDCP data packet is PDCP data packets that start with a count value of the first PDCP data packet and that are counted successive to the count value of the first PDCP data packet.

In this embodiment, since the PDCP recovery/re-establishment or the RLC re-establishment, before the target PDCP data packet is received, the first terminal device always performs a PDCP reordering function.

If the first terminal device does not receive the target PDCP data packet, the first terminal device may save the received first PDCP data packet.

In a first possible embodiment, a PDCP reordering indication may be used to indicate whether the first terminal device performs the PDCP reordering function. When the PDCP reordering indication is a first indication, the first terminal device is instructed not to perform the PDCP reordering function. In other words, if the PDCP reordering indication is a first indication, the first terminal device does not perform the PDCP reordering function. If the PDCP reordering indication is a second indication, the first terminal device performs the PDCP reordering function. In other words, if the PDCP reordering indication is a second indication, the first terminal device performs the PDCP reordering function. It can be understood that, the first indication and the second indication may also be expressed as "true" and "false", "0" and "1", or the like descriptive words used to instruct the terminal to perform the PDCP reordering function and not to perform the PDCP reordering function. For example, if the PDCP reordering indication is false, it indicates that the first terminal device does not perform the PDCP reordering function. If the PDCP reordering is true, it indicates that the first terminal device performs the PDCP reordering function. If the first indication and the second indication are used to indicate two corresponding operations that the first terminal device performs the PDCP reordering function and the first terminal device does not perform the PDCP reordering function, after the PDCP recovery/re-establishment and RLC re-establishment start, the PDCP reordering indication is always the second indication before the target PDCP data packet is received. In the implementation, the first terminal device may set the PDCP reordering indication as the second indication when the PDCP recovery/re-establishment and RLC re-establishment start.

Based on the foregoing operation performed when the first terminal device performs the PDCP reordering function, whether the first PDCP data packet is a next PDCP data packet of a last submitted PDCP data packet may be used as a basis for determining whether the first PDCP data packet is the target PDCP data packet. If the first PDCP data packet is the next PDCP data packet of the last submitted PDCP data packet, the first PDCP data packet is the target PDCP data packet. In this embodiment, the next PDCP data packet of the last submitted PDCP data packet refers to a PDCP data packet whose count value is continuous with a count value of the last submitted PDCP data packet or a PDCP data packet that needs to be submitted subsequently. In an implementation, if a sequence value of the first PDCP data packet is equal to a sequence value of the PDCP data packet last submitted by the PDCP plus one or if a sequence value of the first PDCP data packet is equal to a difference between the sequence value of the PDCP data packet last submitted by the PDCP and a maximum PDCP sequence value, it indicates that the first PDCP data packet is the next PDCP data packet of the last submitted PDCP data packet.

In the implementation, when the PDCP layer of the first terminal device receives the first PDCP data packet, it is determined whether the sequence value of the first PDCP data packet is equal to the sequence value of the PDCP data packet last submitted by the PDCP plus one or whether the sequence value of the first PDCP data packet is equal to the difference between the sequence value of the PDCP data packet last submitted by the PDCP and the maximum PDCP sequence value. If yes, the first PDCP data packet is the target PDCP data packet, a PDCP layer of the first terminal device submits the second PDCP data packet based on an operation performed when the first terminal device performs the PDCP reordering function. If no, the PDCP layer of the first terminal device does not submit the currently received first PDCP data packet.

In an optional implementation, if the first PDCP data packet is the target PDCP data packet, the first terminal device may stop performing the PDCP reordering function. In an implementation, performing the PDCP reordering function may be stopped by setting the PDCP reordering indication as the first indication. In a subsequent data receiving process, the PDCP reordering indication is the first indication, and the first terminal device no longer performs the PDCP reordering function. Based on the operation performed when the first terminal device does not perform the PDCP reordering function, if the PDCP reordering indication is the first indication, the first terminal device submits a PDCP data packet whose count value is less than the count value of the first PDCP data packet, and the first terminal device submits the second PDCP data packet.

In an optional embodiment, if the first PDCP data packet is the target PDCP data packet, the first terminal device sets the PDCP reordering indication as the first indication.

In an optional embodiment, when the first terminal device sends the transmission status report to the network device, if the first PDCP data packet is the target PDCP data packet, and the sequence number of the first PDCP data packet is equal to the sequence number of the first missing PDCP data packet indicated in the transmission status report, the first terminal device sets the PDCP reordering indication as the first indication. In this embodiment, the first missing PDCP data packet is one of the PDCP data packets that are sent by the network device to the first terminal device by using the second terminal device. The first PDCP data packet lost by the first terminal device is the first PDCP data packet in the PDCP data packets that are not received by the first terminal device before the first terminal device is handed over to the network device. For example, the network device sends, by using the second terminal device, PDCP data packets whose sequence numbers are 1 to 100 to the first terminal device. Before the first terminal device is handed over to the network device, sequence numbers of PDCP data packets received by the first terminal device are 1 to 55, 58 to 80, and 83 to 100. Therefore, before the first terminal device is handed over to the network device, the first terminal device does not receive PDCP data packets whose sequence numbers are 56, 57, 81, and 82, where the PDCP data packet whose sequence number is 56 is the first missing PDCP data packet of the first terminal device. If the transmission status report sent by the first device to the network device is a PDCP status report, a sequence number indicated in an FMS (First missing PDCP SN) or an FMC (First missing COUNT) in the transmission status report is 56.

In an implementation, a preset storage domain may be preset in the first terminal device to store a sequence number of the first missing PDCP SDU of the first terminal device. Before the PDCP recovery or re-establishment and the RLC re-establishment are performed on the first terminal device, the preset storage domain is empty. A sequence number stored in the preset storage domain is the same as a sequence number indicated in the FMS in the transmission status report sent by the first terminal device to the network device. For example, when sending the transmission status report to the network device, the first terminal device may store a sequence number indicated in the FMS in the transmission status report in the preset storage domain of the first terminal device. The first terminal device may also store the sequence number of the first missing PDCP data packet in the preset storage domain when the PDCP recovery/re-establishment is performed.

In an optional embodiment, when the first terminal device sends the transmission status report to the network device, if the first PDCP data packet is the target PDCP data packet and the sequence value of the last submitted PDCP data packet is not equal to a sequence value of the first missing PDCP data packet indicated in the transmission status report minus 1, or if the first PDCP data packet is the target PDCP data packet and the sequence value of the last submitted PDCP data packet is not equal to a sum of the first missing PDCP data packet indicated in the transmission status report and the maximum PDCP sequence value minus 1, the first terminal device sets the PDCP reordering indication as the first indication.

In an optional embodiment, when the first terminal device sends the transmission status report to the network device, assuming that a first sequence value indicated by a transmission mapping indication is greater than a sequence value of the first missing PDCP data packet indicated in the transmission status report, if the first PDCP data packet is the target PDCP data packet and a sequence value of the last submitted PDCP data packet is greater than or equal to the first sequence value, or if the first PDCP data packet is the target data packet and a sequence value of the last submitted PDCP data packet is less than a sequence value of the first missing PDCP data packet, the first terminal device sets the PDCP reordering indication as the first indication. Alternatively, when a first sequence value is less than a sequence value of the first missing PDCP data packet, if the first PDCP data packet is the target PDCP data packet, a sequence value of the last submitted PDCP data packet is greater than or equal to the first sequence value, and a sequence value of the last submitted PDCP data packet is less than the sequence value of the first missing PDCP data packet, the first terminal device sets a PDCP reordering indication as a first indication. A PDCP data packet corresponding to the first sequence value is one of the PDCP data packets that are sent by the network device to the first terminal device by using the second terminal device, and the PDCP data packet corresponding to the first sequence value is sent by the network device to the first terminal device by using the second terminal device after the first PDCP data packet of the first terminal device is missing. For example, the network device sends, to the first terminal device by using the second terminal device, PDCP data packets whose sequence values are 1 to 100. The PDCP data packet whose sequence value is 56 is the first missing PDCP SDU of the first terminal device, and the first sequence value may be any sequence value from 57 to 100. If the transmission status report sent by the first device to the network device is a PDCP status report, sequence values indicated in bit mapping (bitmap) in the transmission status report are 57 to 100.

In an implementation, a storage domain of a transmission indication may be preset in the first terminal device to store the first sequence value indicated by the transmission indication, where the first sequence value may be one of the sequence values indicated in the bit mapping. For example, if the first terminal device sends the transmission status report to the network device, when sending the status transmission report to the network device, the first terminal device may store a sequence number in the transmission mapping in the transmission status report in the storage domain of the transmission indication of the first terminal device. The first terminal device may also store the sequence number in the transmission mapping in the storage field of the transmission indication of the first terminal device when the PDCP recovery/re-establishment starts.

In a second possible implementation scenario, when the first terminal device sends the transmission status report to the network device, whether the first terminal device receives the first missing PDCP data packet indicated in the transmission status report may also be used to indicate whether the first terminal device performs the PDCP reordering function. If the first terminal device does not receive the first missing PDCP data packet, the first terminal device performs the PDCP reordering function. If the first terminal device receives the first missing PDCP data packet, the first terminal device stops performing the PDCP reordering function, in other words, does not perform the PDCP reordering function. In this scenario, whether the first terminal device receives the first missing PDCP data packet may be used as a basis for determining whether the data is the target data. If the first PDCP data packet is the first missing PDCP data packet indicated in the transmission status report, the first PDCP data packet is the target PDCP data packet. In the implementation, if the sequence number of the first PDCP data packet is equal to the sequence number of the first missing PDCP data packet, it indicates that the first PDCP data packet is the first missing PDCP data packet indicated in the transmission status report.

In the implementation, when receiving the first PDCP data packet, the PDCP layer of the first terminal device determines whether the sequence number of the first PDCP data packet is equal to the sequence number of the first missing PDCP data packet, and if yes, the first terminal device stops performing the PDCP reordering function. Further, the first terminal device submits a PDCP data packet whose count value is less than the count value of the first PDCP data packet, based on that the first terminal device does not perform the operation corresponding to the PDCP reordering function, and the first terminal device submits a second PDCP data packet.

In an optional embodiment, after the first terminal device submits the second PDCP data packet, the first terminal device releases the transmission status report.

In the implementation, the first terminal device may release the transmission status report by clearing a parameter related to the transmission status report. After releasing the transmission status report, the first terminal device no longer determines whether the sequence number of the PDCP data packet is equal to the sequence number of the first missing PDCP data packet.

It can be noted that, if the first terminal device sends the transmission status report to the network device, the transmission status report not only may be used to indicate the sequence value of the first missing PDCP data packet, but also may be used to indicate the count value of the first missing PDCP data packet. If the transmission status report carries the sequence value of the first missing PDCP data packet, the count value corresponding to the sequence value may be obtained based on the sequence value of the first missing PDCP data packet. If the transmission status report carries the count value of the first missing PDCP data packet, a sequence value corresponding to the count value may be obtained based on the count value of the first missing PDCP data packet. Correspondingly, a transmission mapping indication in the transmission status report may be used to indicate both a sequence value and a first count value. If transmission mapping carries the first sequence value, the first count value corresponding to the first sequence value may be obtained based on the first sequence value. If the transmission status report carries the first count value, the first sequence value corresponding to the first count value may be obtained based on the first count value.

It can be understood that, according to definitions of the PDU and the SDU, the PDCP data packet submitted by the first terminal device refers to a PDCP SDU. Based on the foregoing several scenarios, it may be understood that the first terminal device may comply with one of the following rules when receiving and submitting the PDCP SDU.

Rule 1: If the PDCP SDU received by the PDCP layer is received not due to bottom-layer re-establishment, or if the PDCP reordering indication is a first indication, the first terminal device performs the operation performed when the PDCP reordering function is not performed. If the PDCP SDU received by the PDCP layer is received due to bottom-layer re-establishment, and/or if the PDCP reordering indication is a second indication, the first terminal device performs the operation performed when the PDCP reordering function is performed, and the first terminal device sets the PDCP reordering indication as the first indication.

Rule 2: If the PDCP SDU received by the PDCP layer is received not due to bottom-layer re-establishment, or if the PDCP reordering indication is a first indication, the first terminal device performs the operation performed when the PDCP reordering function is not performed. If the PDCP SDU received by the PDCP layer is received due to bottom-layer re-establishment, and/or if the PDCP reordering indication is a second indication, the first terminal device performs the operation performed when the PDCP reordering function is performed. If the sequence number of the currently received PDCP SDU is equal to the sequence number of the first missing PDCP SDU indicated in the transmission status report, the first terminal device sets the PDCP reordering indication as the first indication.

Rule 3: If the PDCP SDU received by the PDCP layer is received not due to bottom-layer re-establishment, or if the PDCP reordering indication is a first indication, the first terminal device performs the operation performed when the PDCP reordering function is not performed. If the PDCP SDU received by the PDCP layer is received due to bottom-layer re-establishment, and/or if the PDCP reordering indication is a second indication, the first terminal device performs the operation performed when the PDCP reordering function is performed. If the sequence value of the last submitted PDCP SDU is not equal to the sequence value of the first missing PDCP SDU indicated in the transmission status report minus one or the sequence value of the last submitted PDCP SDU is not equal to a sum of the sequence value of the first missing PDCP SDU indicated in the transmission status report and a maximum PDCP sequence value minus one, the first terminal device sets the PDCP reordering indication as the first indication.

Rule 4: If the PDCP SDU received by the PDCP layer is received not due to bottom-layer re-establishment, or if the PDCP reordering indication is a first indication, the first terminal device performs the operation performed when the PDCP reordering function is not performed. If the PDCP SDU received by the PDCP layer is received due to bottom-layer re-establishment, and/or if the PDCP reordering indication is a second indication, the first terminal device performs the operation performed when the PDCP reordering function is performed. When a first sequence value indicated by a transmission mapping indication is greater than a sequence value of the first missing PDCP SDU indicated in the transmission status report, if a sequence value of the last submitted PDCP SDU is greater than or equal to the first sequence value or if a sequence value of the last submitted PDCP SDU is less than a sequence value of the first missing PDCP SDU, the first terminal device sets the PDCP reordering indication as a first indication. Alternatively, when a first sequence value is less than a sequence value of the first missing PDCP SDU, if a sequence value of the last submitted PDCP SDU is greater than or equal to the first sequence value or if a sequence value of the last submitted PDCP SDU is less than a sequence value of the first missing PDCP SDU, the first terminal device sets the PDCP reordering indication as a first indication.

Rule 5: If the PDCP SDU received by the PDCP layer is received not due to bottom-layer re-establishment, or if a sequence number of the currently received PDCP SDU is equal to a sequence number of the first missing PDCP data packet indicated in the transmission status report, the first terminal device performs the operation performed when the PDCP reordering function is not performed, and the first terminal device releases the transmission status report. If the PDCP SDU received by the PDCP layer is received due to bottom-layer re-establishment, and/or if the currently received PDCP SDU is not equal to a sequence number of the first missing PDCP data packet indicated in the transmission status report, the first terminal device performs the operation performed when the PDCP reordering function is performed.

Figure 8:
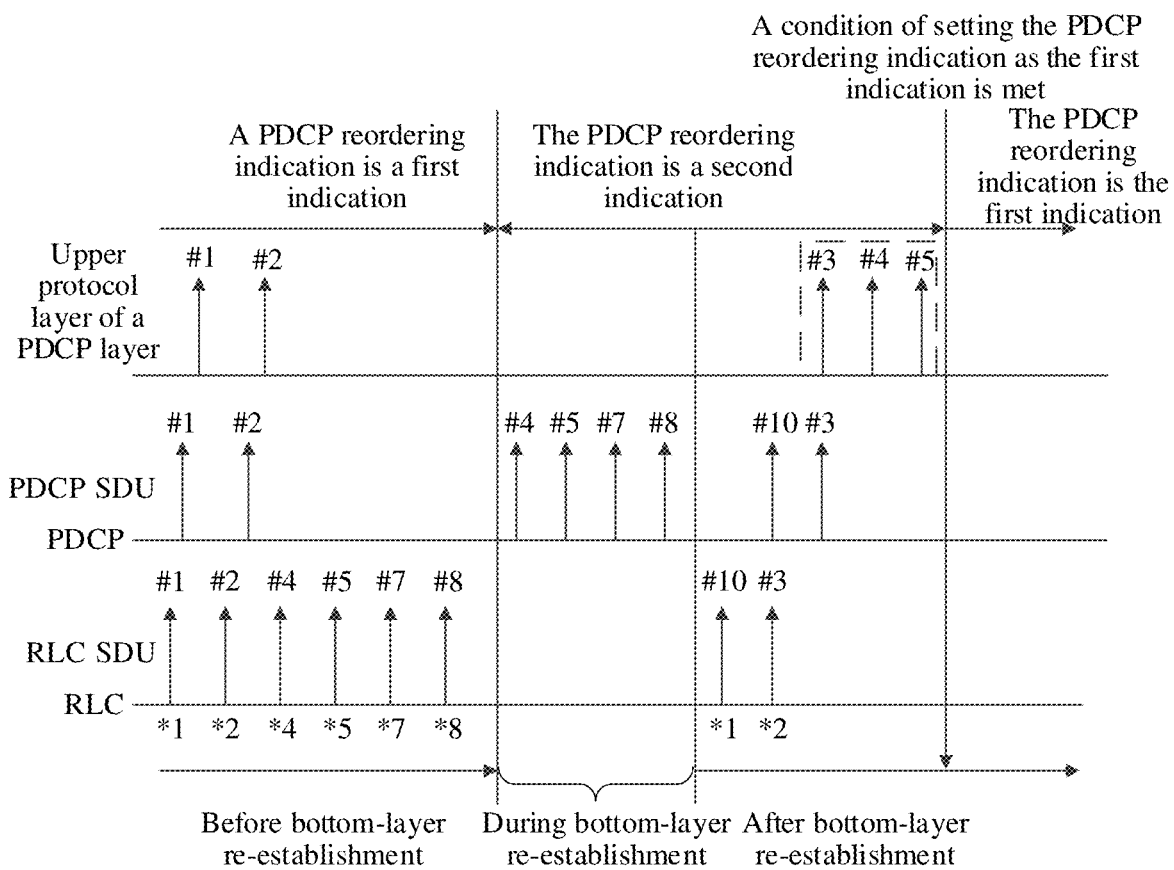
FIG. 8 is a schematic diagram of submitting a PDCP SDU by a terminal device according to an embodiment.
Figure 9:
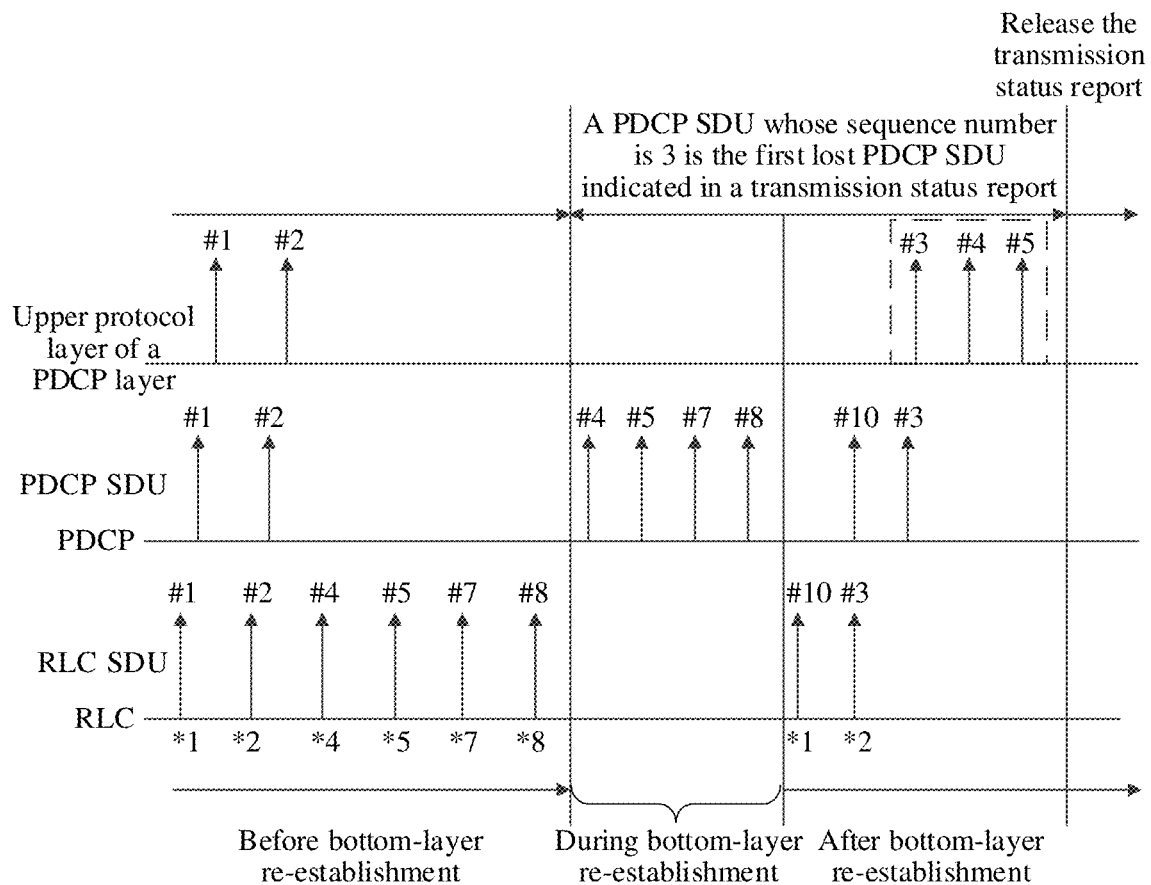
FIG. 9 is another schematic diagram of submitting a PDCP SDU by a terminal device according to an embodiment.

In this embodiment, after receiving a path switching instruction sent by the second terminal device, the first terminal device completes bottom-layer re-establishment and accesses the network device. A process of receiving the data by the first terminal device may include three stages: before the bottom-layer re-establishment, during the bottom-layer re-establishment, and after the bottom-layer re-establishment. The following describes, by using an example, a case in which the terminal receives and submits the PDCP SDU according to the foregoing several rules. Refer to FIG. 8 to FIG. 9. It is assumed that a receiving status of the first terminal device is shown in FIG. 6, in other words, after the bottom-layer reconstruction, the first terminal device receives a PDCP SDU whose sequence value is 3 after receiving a PDCP SDU whose sequence value is 9.

The first terminal device receives and submits the PDCP SDU according to any one of the first rule to the fourth rule, as shown in FIG. 8. According to one of the first rule to the fourth rule, before the bottom-layer re-establishment, the PDCP reordering indication is the first indication, and the first terminal device performs an RLC reordering function, and does not perform a PDCP reordering function, and a process in which the first terminal device submits data is the same as that in FIG. 6. During a bottom-layer re-establishment process, the PDCP reordering indication is the second indication, the first terminal device stops performing an RLC reordering function, but performs a PDCP reordering function, and a process in which the first terminal device submits data is the same as that in FIG. 6. After the bottom-layer re-establishment is completed, the PDCP reordering indication is still the second indication, and the first terminal device performs an RLC reordering function and performs a PDCP reordering function. Because the sequence value 10 is not equal to 2+1, the PDCP layer does not submit a PDCP SDU whose sequence value is 10. When a PDCP SDU whose sequence value is 3 arrives, 3 is equal to 2+1, and PDCP SDUs whose sequence values are 3, 4, and 5 are submitted at the PDCP layer. Further, the first terminal device sets the PDCP reordering indication as the first indication when a condition of setting the PDCP reordering indication as the first indication in the first rule to the fourth rule is met.

The first terminal device receives and submits the PDCP SDU according to the fifth rule, as shown in FIG. 9. In the fifth rule, before the bottom-layer re-establishment, the first terminal device does not send the transmission status report to the network device. Because the process is not a bottom-layer re-establishment process, the first terminal device performs an RLC reordering function and does not perform the PDCP reordering function, and a process in which the first terminal device submits data is the same as that in FIG. 6. In the bottom-layer re-establishment process, a PDCP SDU whose sequence value is 3 is the first missing PDCP SDU indicated in the transmission status report, and neither of the sequence values 4, 5, 7, and 8 is equal to 3. The first terminal device performs an RLC reordering function and performs a PDCP reordering function, and a process in which the first terminal device submits data is the same as that in FIG. 6. After the bottom-layer re-establishment, the sequence value of the first missing PDCP SDU indicated in the transmission status report is 3. Because the sequence value 10 is not equal to 3, the first terminal device does not submit a PDCP SDU whose sequence value is 10. When the PDCP SDU whose sequence value is 3 arrives, 3 is equal to 3, and the first terminal device submits PDCP SDUs whose sequence values are 3, 4, and 5. After the submission is completed, the first terminal device releases the transmission status report.

It can be understood from FIG. 7 to FIG. 9 that, after the patch switching, the first terminal device submits the PDCP data packet only if the first terminal device determines that the received first PDCP data packet is the target PDCP data packet sent by the network device based on the transmission status report, thereby avoiding a problem of packet loss or packet disorder caused by the path switching. In addition, the network device sends the target PDCP data packet to the first terminal device after receiving the transmission status report, thereby further avoiding a problem of packet loss or packet disorder caused by the path switching.

The foregoing describes the embodiments of a method in detail, and the following provides embodiments of an apparatus.

Figure 10:
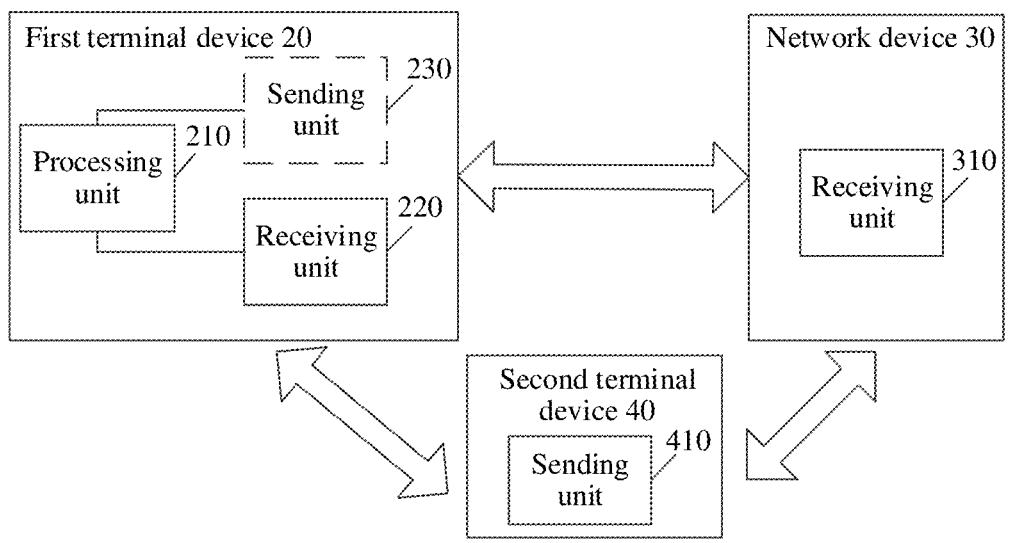
FIG. 10 is a schematic structural diagram of a system including a first terminal device, a network device, and a second terminal device according to an embodiment.

FIG. 10 is a schematic structural diagram of a system including a first terminal device, a network device, and a second terminal device according to an embodiment. As shown in the figure, a communication connection exists between the first terminal device 20, the network device 30, and the second terminal device 40, and mutual data communication between the first terminal device 20, the network device 30, and the second terminal device 40 may be implemented. The first terminal device 20 is configured to perform operations performed by the first terminal device in the embodiments corresponding to FIG. 7 to FIG. 9, and the network device 30 is configured to perform an operation performed by the network device in the embodiment corresponding to FIG. 7, and the second terminal device 40 is configured to perform an operation performed by the second terminal device in the embodiment corresponding to FIG. 7.

As shown in FIG. 10, the first terminal device 20 may include:
- a processing unit 210, configured to perform a process of handover from a second terminal device to a network device;
- the receiving unit 220 is further configured to receive a first packet data convergence protocol PDCP data packet sent by the network device; and
- if the first PDCP data packet is a target PDCP data packet, the processing unit 210 is further configured to submit a second PDCP data packet, where
- the target PDCP data packet is a PDCP data packet sent by the network device based on a transmission status report, and the transmission status report is a status report sent by the first terminal device or the second terminal device to the network device, and used to feed back a receiving status of data that is sent by the network device to the first terminal device by using the second terminal device before the first terminal device is handed over to the network device, and the second PDCP data packet is PDCP data packets that start with a count value of the first PDCP data packet and that are counted successive to the count value of the first PDCP data packet.

In an optional implementation, the first terminal device further includes a sending unit 230, configured to send the transmission status report to the network device.

In an optional implementation, if the first PDCP data packet is a next PDCP data packet of a last submitted PDCP data packet, the first PDCP data packet is the target PDCP data packet; and the last submitted PDCP data packet is a PDCP data packet that is submitted latest among PDCP data packets submitted by the first terminal device.

In an optional implementation, if the first PDCP data packet is the target PDCP data packet, the processing unit 210 is further configured to set a PDCP reordering indication as a first indication.

In an optional implementation, if the first PDCP data packet is the target PDCP data packet, and a sequence number of the first PDCP data packet is equal to a sequence number of the first missing PDCP data packet indicated in the transmission status report, the processing unit 210 is further configured to set a PDCP reordering indication as a first indication.

In an optional implementation, when a first sequence value indicated by a transmission mapping indication is greater than a sequence value of the first missing PDCP data packet indicated in the transmission status report, if the first PDCP data packet is the target PDCP data packet and a sequence value of the last submitted PDCP data packet is greater than or equal to the first sequence value, or if the first PDCP data packet is the target PDCP data packet and a sequence value of the last submitted PDCP data packet is less than a sequence value of the first missing PDCP data packet, the processing unit 210 is further configured to set the PDCP reordering indication as a first indication; or when the first sequence value is less than a sequence value of the first missing PDCP data packet, if the first PDCP data packet is the target PDCP data packet, a sequence value of the last submitted PDCP data packet is greater than or equal to the first sequence value, and a sequence value of the last submitted PDCP data packet is less than the sequence value of the first missing PDCP data packet, the processing unit 210 is further configured to set a PDCP reordering indication as a first indication; and the first sequence value is a sequence value corresponding to the PDCP data packet indicated in the transmission status report.

In an optional implementation, if the PDCP reordering indication is the first indication, the processing unit 210 is further configured to submit a PDCP data packet whose count value is less than the count value of the first PDCP data packet; and submit the second PDCP data packet.

In an optional implementation, if the first PDCP data packet is the first missing PDCP data packet indicated in the transmission status report, the first PDCP data packet is the target PDCP data packet; and the processing unit 210 is further configured to submit a PDCP data packet whose count value is less than the count value of the first PDCP data packet.

In an optional implementation, the processing unit 210 is further configured to release the transmission status report.

As shown in FIG. 10, the network device 30 may include:
- a receiving unit 310, configured to receive a transmission status report sent by a first terminal device or a second terminal device, where the transmission status report is used to feed back a receiving status of data that is sent by the network device to the first terminal device by using the second terminal device before the first terminal device is handed over to the network device; and
- after the first terminal device is handed over from the second terminal device to the network device, the sending unit 310 is further configured to send a target PDCP data packet to the first terminal device based on the transmission status report.

As shown in the figure, the second terminal device 40 may include:
- a sending unit 410, configured to send a transmission status report to a network device, where the transmission status report is used to feed back a receiving status of data that is sent by the network device to the first terminal device by using the second terminal device before the first terminal device is handed over to the network device; and the transmission status report is used by the network device to send a target PDCP data packet to the first terminal device based on the transmission status report.

Figure 11:
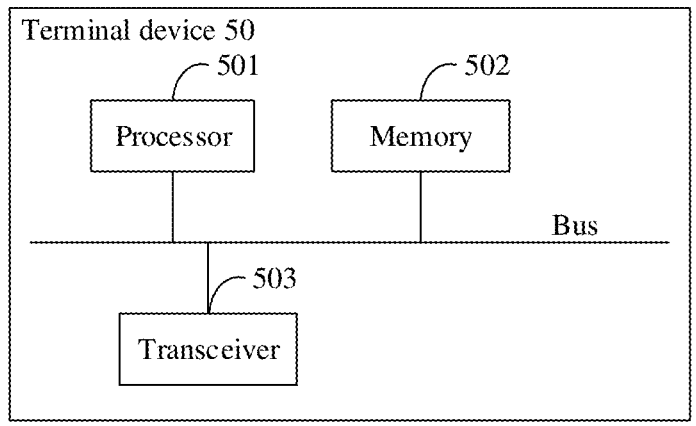
FIG. 11 is a possible schematic structural diagram of a terminal device according to an embodiment.

In a possible embodiment, related functions implemented by the receiving unit 220, the processing unit 210, and the sending unit 230 of the first terminal device in FIG. 10 may be implemented with reference to a processor and a transceiver. FIG. 11 is a possible schematic structural diagram of a terminal device according to an embodiment. The terminal device 50 includes a processor 501, a memory 502, and a transceiver 503. The processor 501, the memory 502, and the transceiver 503 are connected by using one or more communications buses. The processor 501 is configured to support the terminal device in performing a function of the first terminal device in the method in FIG. 7. The processor 501 may be a central processing unit (CPU), a network processor, a hardware chip, or any combination thereof. The foregoing hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 502 is configured to store program code and the like. The memory 502 may include a volatile memory such as a random access memory (RAM), or the memory 502 may further include a non-volatile memory such as a read-only memory (ROM), a flash memory, a hard disk drive (HDD), or a solid-state drive (SSD), or the memory 502 may include a combination of the foregoing types of memories.

The transceiver 503 is configured to receive and send data, for example, receive a first PDCP data packet sent by a network device.

The processor 501 may invoke the program code to perform the following operations:
  performing a process of handover from a second terminal device to a network device;
  receiving, by using the transceiver 503, a first packet data convergence protocol PDCP data packet sent by the network device; and
  if the first PDCP data packet is a target PDCP data packet, submitting a second PDCP data packet, where the target PDCP data packet is a PDCP data packet sent by the network device based on a transmission status report, and the transmission status report is a status report sent by the first terminal device or the second terminal device to the network device, and used to feed back a receiving status of data that is sent by the network device to the first terminal device by using the second terminal device before the first terminal device is handed over to the network device, and the second PDCP data packet is PDCP data packets that start with a count value of the first PDCP data packet and that are counted successive to the count value of the first PDCP data packet.

Further, the processor 501 may further cooperate with the transceiver 503 to perform operations of the first terminal device in the embodiments shown in FIG. 7 to FIG. 9. For details, refer to the description in the method embodiment. Details are not described herein again for the sake of brevity.

Figure 12:
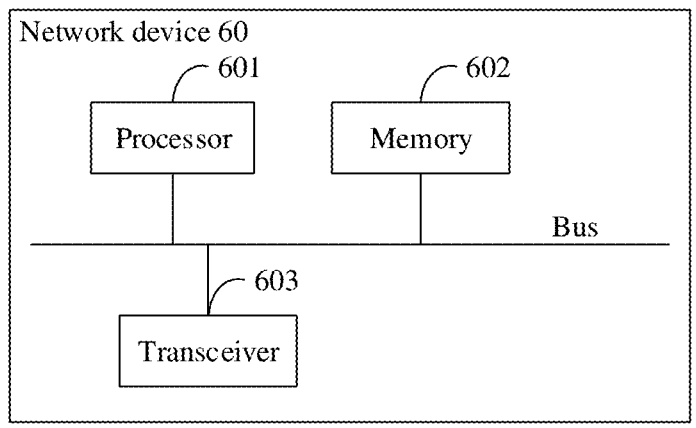
FIG. 12 is a possible schematic structural diagram of a network device according to an embodiment.

In a possible embodiment, related functions implemented by the receiving unit 310 of the network device in FIG. 10 may be implemented with reference to a processor and a transceiver. FIG. 12 is a possible schematic structural diagram of a network device according to an exemplary embodiment. The network device 60 includes a processor 601, a memory 602, and a transceiver 603. The processor 601, the memory 602, and the transceiver 603 are connected by using one or more communications buses.

The processor 601 is configured to support the network device in performing a function of the network device in the method in FIG. 7. The processor 601 may be a CPU, a network processor NP, a hardware chip, or any combination thereof. The foregoing hardware chip may be an ASIC, a PLD, or a combination thereof. The PLD may be a CPLD, a FPGA, GAL, or any combination thereof.

The memory 602 is configured to store program code and the like. The memory 602 may include a volatile memory such as a RAM, or the memory 602 may further include a non-volatile memory such as a ROM, a flash memory, a HDD), or a SSD, or the memory 602 may include a combination of the foregoing types of memories.

The transceiver 603 is configured to receive and send data. For example, the transceiver 603 is configured to send a path switching instruction, receive a transmission status report, or the like.

The processor 601 may invoke the program code to perform the following operations:
  receiving, by using the transceiver 603, a transmission status report sent by a first terminal device or a second terminal device, where the transmission status report is used to feed back a receiving status of data that is sent by the network device to the first terminal device by using the second terminal device before the first terminal device is handed over to the network device; and
  after the first terminal device is handed over from the second terminal device to the network device, the transceiver 603 sends a target PDCP data packet to the first terminal device based on the transmission status report.

Further, the processor 601 may further cooperate with the transceiver 603 to perform an operation of the network device in the embodiment shown in FIG. 7. For details, refer to the description in the method embodiment. Details are not described herein again for the sake of brevity.

Figure 13:
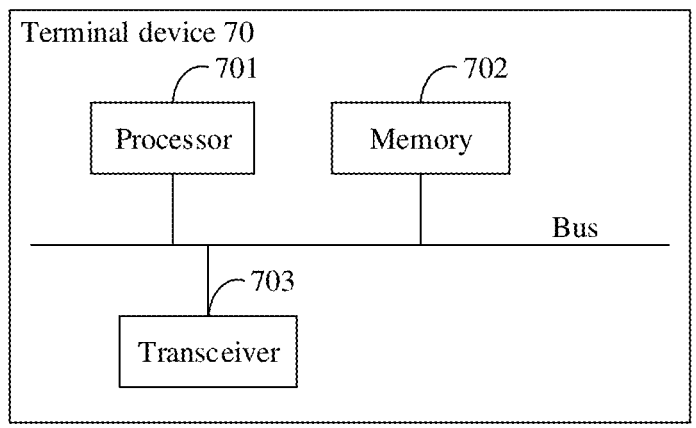
FIG. 13 is a possible schematic structural diagram of another terminal device according to an embodiment.

In a possible embodiment, related functions implemented by the sending unit 410 of the second terminal device in FIG. 10 may be implemented with reference to a processor and a transceiver. FIG. 13 is a possible schematic structural diagram of a terminal device according to an embodiment. The terminal device 70 includes a processor 701, a memory 702, and a transceiver 703. The processor 701, the memory 702, and the transceiver 703 are connected by using one or more communications buses. The processor 701 is configured to support the terminal device in performing a function of the second terminal device in the method in FIG. 7. The processor 701 may be a CPU, a network processor NP, a hardware chip, or any combination thereof. The foregoing hardware chip may be an ASIC, a PLD, or a combination thereof. The PLD may be a CPLD, a FPGA, GAL), or any combination thereof.

The memory 702 is configured to store program code and the like. The memory 702 may include a volatile memory such as a RAM, or the memory 702 may further include a non-volatile memory such as a ROM, a flash memory, a HDD, or a SSD), or the memory 702 may include a combination of the foregoing types of memories.

The transceiver 703 is configured to receive and send data. For example, the transceiver is configured to send a path switching instruction, send a transmission status report, or the like.

The processor 701 may invoke the program code to perform the following operations:
  sending, by using the transceiver 703, a transmission status report to a network device, where the transmission status report is used to feed back a receiving status of data that is sent by the network device to the first terminal device by using the terminal device before the first terminal device is handed over to the network device; and the transmission status report is used by the network device to send a target PDCP data packet to the first terminal device based on the transmission status report.

Further, the processor 701 may further cooperate with the transceiver 703 to perform an operation of the second terminal device in the embodiment shown in FIG. 7. For details, refer to the description in the method embodiment. Details are not described herein again for the sake of brevity.

An embodiment further provides a computer storage medium, where the computer storage medium stores a computer program, the computer program includes a program instruction, and when being executed by a computer, the program instruction enables the computer to perform the method described in the embodiment corresponding to FIG. 7, the computer may be a part of the foregoing first terminal device, the network device, or the second terminal device.

An embodiment further provides a computer program, including a program instruction, where when being executed by a computer, the program instruction is used to perform the method described in the embodiment corresponding to FIG. 7, and the computer program may be a part of the program stored in the foregoing memory 502, memory 602, or memory 702.

A person of ordinary skill in the art may be aware that, the units and algorithm steps in the examples described with reference to the disclosed embodiments can be implemented by electronic hardware or a combination of computer software and electronic hardware. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

It may be clearly understood by a person of ordinary skill in the art that for the purpose of convenient and brief description, for a detailed working process of the described system, apparatus, and unit, refer to a corresponding process in the foregoing method embodiments. Details are not described herein again for the sake of brevity. In the several provided embodiments, it should be understood that the disclosed system, apparatus, and method may be implemented in other manners. For example, the described apparatus embodiments are merely examples. For example, the unit division is merely logical function division. There may be another division manner in actual implementation. For example, a plurality of units or components may be combined or integrated into another system, or some features may be ignored or may be not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments. In addition, function units in the embodiments may be integrated into one processing unit, or each of the units may exist alone physically, or two or more units may be integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or another programmable apparatus. The computer instruction may be stored in a computer readable storage medium, or may be transmitted by using the computer readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

The descriptions are only implementations of the embodiments, but are not intended to limit the protection scope of the present invention. Any variation or replacement readily figured out by a person of ordinary skill in the art within the technical scope disclosed in the present invention shall fall within the protection scope of the present invention.

The invention claimed is:

1. A data transmission method, comprising:
handing over a first terminal device from a second terminal device to a network device;
receiving, by the first terminal device, a first packet data convergence protocol (PDCP) data packet sent by the network device; and
submitting, by the first terminal device, a second PDCP data packet, wherein a target PDCP data packet is a PDCP data packet sent by the network device based on a transmission status report.

2. The data transmission method according to claim 1, wherein, after the handing over the first terminal device from the second terminal device to the network device, the method further comprises:
sending, by the first terminal device, the transmission status report to the network device.

3. The data transmission method according to claim 1, wherein after the first PDCP data packet is a next PDCP data packet of a last submitted PDCP data packet, the first PDCP data packet is the target PDCP data packet, and the last submitted PDCP data packet is a PDCP data packet that is submitted latest among the PDCP data packets submitted by the first terminal device.

4. The data transmission method according to claim 3, wherein the method further comprises:
after the first PDCP data packet is the target PDCP data packet,
setting, by the first terminal device, a PDCP reordering indication as a first indication.

5. The data transmission method according to claim 3, wherein the method further comprises:
after the first PDCP data packet is the target PDCP data packet, and a sequence number of the first PDCP data packet is equal to a sequence number of a first missing PDCP data packet indicated in the transmission status report,
setting, by the first terminal device, a PDCP reordering indication as a first indication.

6. The data transmission method according to claim 3, wherein the method further comprises:
when the first sequence value is less than a sequence value of the first missing PDCP data packet, after the first PDCP data packet is the target PDCP data packet, a sequence value of the last submitted PDCP data packet is greater than or equal to the first sequence value, and the sequence value of the last submitted PDCP data packet is less than the sequence value of the first missing PDCP data packet,
setting, by the first terminal device, the PDCP reordering indication as the first indication, wherein the first sequence value is a sequence value corresponding to the PDCP data packet indicated in the transmission status report.

7. The data transmission method according to claim 4, wherein the method further comprises:
after the PDCP reordering indication is the first indication, submitting, by the first terminal device, wherein the PDCP data packet of which the count value is less than the count value of the first PDCP data packet; and
submitting, by the first terminal device, the second PDCP data packet.

8. A plurality of terminal devices, each of the plurality of terminal devices comprising:
a processor;
a memory; and
a transceiver, wherein the memory is configured to store program code, the plurality of terminal devices include a first terminal device and a second terminal device, and the processor of the first terminal device is configured to execute the program code to
perform a process of handover from a second terminal device to a network device;
receive, by using the transceiver, a first PDCP data packet sent by the network device; and
submit a second PDCP data packet, wherein a target PDCP data packet is a PDCP data packet sent by the network device based on a transmission status report.

9. The plurality of terminal devices according to claim 8, wherein the processor of the first terminal device is further configured to
send, by using the transceiver of the first terminal device, the transmission status report to the network device.

10. The plurality of terminal devices according to claim 8, wherein after the first PDCP data packet is a next PDCP data packet of a last submitted PDCP data packet, the first PDCP data packet is the target PDCP data packet, and the last submitted PDCP data packet is a PDCP data packet that is submitted latest among the PDCP data packets submitted by the first terminal device.

11. The plurality of terminal devices according to claim 10, wherein the processor of the first terminal device is further configured to perform:
after the first PDCP data packet is the target PDCP data packet, setting a PDCP reordering indication as a first indication.

12. The plurality of terminal devices according to claim 10, wherein the processor of the first terminal device is further configured to, after the first PDCP data packet is the target PDCP data packet, and a sequence number of the first PDCP data packet is equal to a sequence number of a first missing PDCP data packet indicated in the transmission status report,
set a PDCP reordering indication as a first indication.

13. The plurality of terminal devices according to claim 10, wherein the processor of the first terminal device is further configured to, when a first sequence value is less than a sequence value of the first missing PDCP data packet, after the first PDCP data packet is the target PDCP data packet, a sequence value of the last submitted PDCP data packet is greater than or equal to the first sequence value, and the sequence value of the last submitted PDCP data packet is less than the sequence value of the first missing PDCP data packet,
set the PDCP reordering indication as the first indication, wherein the first sequence value is a sequence value corresponding to the PDCP data packet indicated in the transmission status report.

14. The plurality of terminal devices according to claim 11, wherein the processor of the first terminal device is further configured to, after the PDCP reordering indication is the first indication,
submit the PDCP data packet of which a count value is less than a count value of the first PDCP data packet, and
submit the second PDCP data packet.

15. The plurality of terminal devices according to claim 9, wherein after the first PDCP data packet is a first missing PDCP data packet indicated in the transmission status report, the first PDCP data packet is the target PDCP data packet, and the processor of the first terminal device is further configured to
submit the PDCP data packet of which a count value is less than a count value of the first PDCP data packet.

16. The plurality of terminal devices according to claim 15, wherein the processor of the first terminal device is further configured to
release the transmission status report.

17. A network device, comprising:
a processor;
a memory; and a
transceiver, wherein the processor, the memory, and the transceiver are connected to each other, the memory is configured to store program code, and the processor is configured to execute the program code to
receive, by using the transceiver, a transmission status report sent by a first terminal device or a second terminal device, wherein the transmission status report is used to feed back a receiving status of data that is sent by the network device to the first terminal device by using the second terminal device before the first terminal device is handed over to the network device, and
after the first terminal device is handed over from the second terminal device to the network device, send, by using the transceiver, a target PDCP data packet to the first terminal device based on the transmission status report.

* * * * *